United States Patent [19]

Sawatzky et al.

[11] Patent Number: 5,312,483
[45] Date of Patent: May 17, 1994

[54] ADHESION OF ASPHALT TO AGGREGATES

[75] Inventors: Henry Sawatzky, Ottawa; Floyd I. Clelland, Renfrew; Brian A. Farnand, Nepean, all of Canada

[73] Assignee: Her Majesty The Queen in Right of Canada As Represented By the Minister of Energy, Mines and Resources, Canada

[21] Appl. No.: 815,835

[22] Filed: Dec. 27, 1991

Related U.S. Application Data

[63] Continuation of Ser. No. 641,861, Jan. 16, 1991, abandoned.

[51] Int. Cl.$^5$ .................................. C09D 195/00
[52] U.S. Cl. ............................ 106/284.4; 106/284.06
[58] Field of Search ....................... 106/284.4, 284.06

[56] References Cited

U.S. PATENT DOCUMENTS

| | | | |
|---|---|---|---|
| 3,028,249 | 4/1962 | Arnold et al. | 106/284.4 |
| 4,177,079 | 12/1979 | Espenschield | 106/274 |
| 4,298,379 | 11/1981 | Burris | 106/284.4 |
| 4,298,397 | 11/1981 | Burns | 106/274 |
| 4,325,738 | 4/1982 | Plancher et al. | 106/284.4 |
| 4,904,305 | 2/1990 | Zanzotto et al. | 106/278 |

FOREIGN PATENT DOCUMENTS 1225062  8/1987  Canada .................. C10G 1/00

*Primary Examiner*—David Brunsman
*Attorney, Agent, or Firm*—Ezra Sutton

[57] ABSTRACT

Novel bituminous coating compositions, bituminous paving compositions and asphaltic compositions are provided herein. These compositions have, in common, from about 0.1% to about 8% by weight of a nitrogen-containing, adhesion-improving, anti-stripping agent therein. Such agent is a sewage sludge-derived oil, or a fraction thereof, which comprises a mixture of saturated aliphatic hydrocarbons, monoaromatic hydrocarbons, diaromatic hydrocarbons, polyaromatic hydrocarbons, polar compounds and basic, pyridine-soluble compounds having the following elemental composition: nitrogen, about 3.4% to about 5% by weight; oxygen, about 5.8% to about 6.9% by weight; sulfur, about 0.3% to about 0.8% by weight; hydrogen, about 9.7% to about 10.4% by weight; and carbon, about 76.9% to about 79.8% by weight.

11 Claims, 4 Drawing Sheets

CI = COMMERCIAL ASPHALT I  CII = COMMERCIAL ASPHALT 2
BOTH CI AND CII WERE 85/100 ASPHALTS
SDO = SEWAGE SLUDGE - DERIVED OIL
THE 17% SDO WAS -400°C; THE 1% AND 5% SDO WERE +250°C

ADHESION OF ASPHALT TO AGGREGATES

This application is a continuation of application Ser. No. 07/641,861, filed Jan. 16, 1991 now abandoned.

BACKGROUND OF THE INVENTION (i) Field of the Invention

This invention relates to a novel agent for improving the adhesion of asphalt to aggregate and to the improved asphaltic concrete so formed.

(ii) Description of Prior Art

The use of asphalt in the production of road-making materials is well known. The asphalt material acts as a binder for solid aggregates. Typical solid aggregates which have been employed include stone, gravel and slag.

Road construction has many variations. Asphaltic concrete can be used for the entire road bed or just for the surface. Asphaltic concrete, particularly at the road surface, has considerable advantages over other materials particularly due to its elasticity and compliance. However, the asphaltic concrete does deteriorate with time and heavy traffic. Deterioration can be accelerated due to weakening of the asphaltic concrete due to the stripping of asphalt cement from the aggregate by moisture. One aim of this invention is the improvement of resistance to this stripping.

The quality of the aggregate is also important. A number of materials with appropriate size distribution can serve as aggregates; among these are sand, limestone, slag, lime, vulcanized rubber, or ground and screened coke obtained by any known method from coal or oil. A mixture of aggregates can also be used. The susceptibility to stripping can vary considerably for different aggregates.

An asphaltic cement satisfactory for use as a bonding and coating agent for mineral aggregate should have the following properties: it should be able to coat completely the aggregate; it should have such adhesive qualities that the adhesion between the asphalt and the aggregate is not disrupted in the presence, or because, of water or by variations in climatic conditions; it should provide the pavement with a certain amount of resiliency and a high coefficient of "rehealing"; and it should so resist oxidation that the pavement retains its rehealing characteristic over a long period of time, the ideal asphaltic concrete being one in which the asphaltic cement is as soft as possible and yet has the capacity of resisting being deformed by traffic shocks and impacts.

At this time most of the asphaltic concrete road construction involves hot mixing and paving while the mixture is hot. However, paving can also involve mixtures containing emulsified or cut-back asphalts.

It is well known that asphalt can have poor adhesion to aggregate in the presence of water. Aggregate can be preferentially wetted by water, so that even if the aggregate was dry at the time it was blended with the asphalt, in the course of time the penetration of water into the asphalt composition reaches the aggregate and then interferes with the bond between the aggregate and the asphalt, leading to separation of the asphalt from the aggregate, with resulting breakup of the composition.

Asphalt compositions used in asphalt pavings are viscous semi-solid materials. In order to apply these materials to a surface it is necessary first to convert them to a temporarily fluid state, e.g., by lowering the viscosities by heating or by production of emulsions or by cutting back with liquid hydrocarbons.

The adhesion between asphalt and aggregate is known to be improved by the addition of a basic substance, e.g., an amine, thereto. The result is an increased pavement life.

Examples of some basic additives which have been used in the past for this purpose include the primary alkyl amines, e.g., lauryl amine, stearyl amine, and the alkylene diamines, particularly the alkyl-substituted alkylene diamines, e.g., N-stearyl-1,3-propylene diamine. Amides are also used in some anti-stripping formulations. The production of these additives involves considerable costs.

Many patents have proposed the use of such anti-stripping agents in asphalt/aggregate mixture to provide road surfacing composition.

Canadian Patent No. 425,128 patented Jan. 16, 1945 provided a bituminous bonding material comprising a bituminous material, a solid mineral aggregate and a small quantity of a long chain alkyl amidine, e.g., a compound obtained by the successive action of alcohol hydrogen chloride and ammonia on a high molecular weight alkyl nitrile.

Canadian Patent No. 481,806 patented Aug. 18, 1952 by F. C. Gzemski, provided a method of improving the adhesivity of bitumens to mineral aggregates, e.g., to provide improved road paving compositions. The patentee taught the incorporation in the bitumen of a relatively small quantity of a cyclic nitrogen base sulfonate, (e.g., particularly a pyridinium and quinolinium salts of oil-soluble petroleum sulfonic acids) to increase the wetting power or adhesivity of the bitumens for aggregates.

Canadian Patent No. 986,256 issued Mar. 30, 1976 to M. E. Hellsten et al, taught that the adhesion between asphalt and aggregate would be greatly improved by the addition of a cationic substance, e.g., an amine. The patentee thus provided an asphalt composition having improved adhesion to aggregate comprising asphalt and an amount, sufficient to improve the adhesion of the asphalt to aggregate, of an ether amine having a specifically-recited formula.

U.S. Pat. No. 2,416,134 patented Feb. 18, 1947 by W. W. Allen, provided a road paving bituminous emulsion of the water-in-oil type. Such emulsion included liquified bitumen, an aliphatic amine containing not less than five carbon atoms, and a particularly-defined water insoluble fatty acid soap in colloidal suspension.

U.S. Pat. No. 3,868,263 patented Feb. 25, 1975 by K. E. McConnaughey, provided a method of making a paving composition in which a primary bituminous binder containing an adhesion promoter was mixed with an aggregate. The primary binder was allowed to cure on the aggregate to form a premix of binder-coated aggregate. After such curing, the premix was then mixed with a secondary bituminous binder to form the paving composition.

U.S. Pat. No. 4,325,738 patented Apr. 20, 1982 by H. Plancher et al, provided a bituminous binder composition, including: a bituminous material, and a minor amount of a moisture-damage-inhibiting agent, comprising a high nitrogen content fraction obtained from shale oil.

U.S. Pat. No. 4,765,839 patented Aug. 23, 1988 by D. S. Treybig et al, provided bituminous composition having incorporated therein the reaction product of an organic amine with a substituted nitrogen-containing heterocyclic compound as an anti-stripping agent.

U.S. Pat. No. 3,928,061 patented Dec. 23, 1971 and U.S. Pat. No. 4,038,102 patented Jul. 26, 1977 by M. E. Hellsten et al, each provided asphalt compositions having improved adhesion to aggregate, comprising an alkyl oxyalkylene amine and, optionally, an alkanolamine.

U.S. Pat. No. 2,336,468 patented Dec. 14, 1943 by W. G. Cole et al, provided a process of coating a hydrophilic aggregate with a bitumen emulsifier. The bituminous emulsion contained an alkaline aqueous phase containing glycinin as a stabilizer.

U.S. Pat. No. 3,085,891 patented Apr. 16, 1963, provided asphalt compositions resistant to stripping, consisting essentially of asphalt and a particularly specified substituted oxazoline.

SUMMARY OF THE INVENTION

(i) Aims of the Invention

The principal object of the invention is the utilization of an effective amount of an agent, not heretofore known as an anti-stripping agent in asphalt cement to provide an improved resistance of stripping of asphalt cement from the aggregates in asphaltic concrete.

(ii) Statement of Invention

By this invention, a bituminous coating composition is provided comprising asphalt cement and an effective amount of a nitrogen containing anti-stripping agent comprising a sewage sludge-derived oil, or a fraction thereof, comprising a mixture of saturated aliphatic hydrocarbons, monoaromatic hydrocarbons, diaromatic hydrocarbons, polyaromatic hydrocarbons, polar compounds and basic, pyridine-soluble compounds having the following elemental composition: nitrogen, about 3.4% to about 5% by weight; oxygen, about 5.8% to about 6.9% by weight; sulfur, about 0.3% to abut 0.8% by weight; hydrogen, about 9.7% to about 10.4% by weight; and carbon, about 76.9% to about 79.8% by weight.

This invention also provides a bituminous paving composition consisting essentially of: aggregate; an asphalt selected from the group consisting of bitumen, asphalt and crude residuum containing asphaltenes; and an effective amount, from about 0.1% to about 8% by weight, of a nitrogen-containing, adhesion-improving anti-stripping agent comprising sewage sludge-derived oil, or a fraction thereof, said sewage sludge-derived oil comprising a mixture of saturated aliphatic hydrocarbons, monoaromatic hydrocarbons, diaromatic hydrocarbons, polyaromatic hydrocarbons, polar compounds and basic, pyridine-soluble compounds, having the following elemental composition: nitrogen, about 3.4% to about 5% by weight; oxygen, about 5.8% to about 6.9% by weight; sulfur, about 0.3% to about 0.8% by weight; hydrogen, about 9.7% to about 10.4% by weight; and carbon, about 76.9% to about 79.8% by weight.

This invention further provides an asphalt composition consisting essentially of: an asphaltic cement; and an effective amount, from about 0.1% to about 8% by weight, of a nitrogen-containing, adhesion-improving, anti-stripping agent comprising sewage sludge-derived oil, or a fraction thereof, said sewage sludge-derived oil comprising a mixture of saturated aliphatic hydrocarbons, monoaromatic hydrocarbons, diaromatic hydrocarbons, polyaromatic hydrocarbons, polar compounds and basic, pyridine-soluble compounds, having the following elemental composition: nitrogen, about 3.4% to about 5% by weight; oxygen, about 5.8% to about 6.9% by weight; sulfur, about 0.3% to about 0.8% by weight; hydrogen, about 9.7% to about 10.4% by weight, and carbon, about 76.9% to about 79.8% by weight.

(iii) Further Features of the Invention

The sewage sludge-derived oil, used in the above embodiments of the invention, preferably has the following elemental compositions, nitrogen, 3.42% to 4.95% by weight; oxygen, 5.84% to 6.89% by weight; sulfur, 0.34% to 0.83% by weight; hydrogen, 9.70% to 10.44%; and carbon, 76.92% to 79.76% by weight.

The amount of such sewage sludge-derived oil used in the above embodiments of the invention is preferably from about 1% to about 5% by weight.

(iv) Generalized Description of the Invention

The aggregate employed herein in the development of the present invention was selected as being prone to stripping in order to demonstrate the effectiveness of the sewage sludge-derived oil fractions as anti-stripping agents, as well as the effectiveness of commercial anti-stripping agents for comparison. The aggregate was obtained from a quarry in Renfrew County in Ontario, Canada, designated by the Ministry of Transportation of Ontario as permissible for use in road compositions only when used with an adhesion improver. The bituminous material which may be employed herein in the practice of the present invention is not critical. Any bitumen, asphalt or crude residuum containing asphaltenes can be employed. In general, the asphalt which can be employed is conventional petroleum asphalt. The asphalt cement requirement is set forth in ASTM D 3381-83 and D 946-82, the standard specifications for VISCOSITY-GRADED and PENETRATION-GRADED ASPHALT CEMENTS FOR USE IN PAVEMENT CONSTRUCTION, respectively. Preferred asphalts are the normal paving asphalts (e.g., AC5, AC10, AC20, and AC30, where AC indicates asphalt cement and the number indicates the viscosity at 140° F. in poises divided by 100 and penetration graded asphalt, designated according to their penetration ranges (dmm) obtained at 25° C., 100 g, 5 sec. In Canada the most common grades are 85/100 and 150/200.).

The sewage sludge-derived oil used in the present invention may be produced according to the teachings of Canadian Patent No. 1,225,062, issued Aug. 4, 1987, to T. R. Bridle, the contents of the entire disclosure being incorporated herein by reference, and so will not be described further.

The above-described sewage sludge-derived oils may desirably have the following composition:

It comprises a mixture of saturated aliphatic hydrocarbons, monoaromatic hydrocarbons, diaromatic hydrocarbons, polyaromatic hydrocarbons, polar compounds and basic, pyridine-soluble compounds having the following elemental composition: nitrogen, about 3.4% to about 5% by weight; oxygen, about 5.8% to about 6.9% by weight; sulfur, about 0.3% to about 0.8% by weight; hydrogen, about 9.7% to about 10.4% by weight; and carbon, about 76.9% to about 79.8% by weight.

The sewage sludge-derived oils can be dehydrated by distillation. Large portions of the nitrogenous groups appear to be amine and amides with some pyridinic and pyrrolic types. Large portions of the oxygen containing groups appear to be carboxylic and amide types.

The following standard test methods were used for determining the properties of the asphalt blends, according to this invention, containing sewage sludge-derived oil fractions:

The Standard Test Method for Penetration of Bituminous Materials is ASTM D5-86.

The Standard Test Method for Softening Point of Bitumen (Ring-and-Ball Apparatus) is ASTM D 36-86.

The Standard Test Method for Effect of Heat and Air in Asphaltic Materials (Thin-Film Over Test) is ASTM D1754-87.

The Standard Test Method for Ductility of Bituminous Materials is ASTM D 113-86.

The Standard Specification for Penetration-Graded Asphalt Cement for Use in Pavement Construction is ASTM D 946-82.

The Standard Test Method for Solubility of Asphalt Materials in Trichloroethylene is ASTM D 2042-81.

Standard Test Method for Kinematic Viscosity of Asphalts (Bitumens) is ASTM D 2170-85.

Standard Test Method for Viscosity of Asphalts by Vacuum Capillary Viscometer is ASTM D 2171-88.

The Standard Test Method for Separation of Asphalt into Four Fractions is ASTM D4124-86.

The Standard definitions of terms relating to materials for roads and pavements are given in ASTM D8-88.

Stripping by static immersion is described by Ministry of Transportation of Ontario (MTO).

The materials used were as follows:

Distillation fractions of sewage sludge-derived oils: +150° C., +250° C., +350° C., +400° C.; Shell, Gulf, and Petro Canada 85/100 Pen grade asphalt, and Petro Canada 150/200 Pen grade asphalt.

The sewage sludge-derived oils used have the compositions as previously described.

Certain conventional anti-stripping agents were also used as a comparison, namely the following:

1) NALCLAD RL-2A

NALCLAD RL-2A may be defined as follows: NALCLAD is the trade-mark of Alchem Inc. for its brand of asphalt anti-stripping agent. It is composed of heavy aromatic naphtha, ethylene glycol monoethyl-ether and tetraethylene pentaamine. It is a block, clear/-hazy liquid with an aromatic odour. Its specific gravity is 0.94 at 25° C., and is reported to be oil soluble.

2) ALKAZINE O

ALKAZINE O is the trade-mark of ALKARIL CHEMICALS LTD. for its brand of fatty hydroxyethyl imidazoline, namely 1H-Imidazole-1-ethanol,2-(8-heptadecenyl)-4,5-dihydro-,(Z)-;   $C_{22}H_{42}N_2O$  MW=355.

Chemical Identity: Oleic hydroxyethyl imidazoline; Oleic aminoethyl ethanolamide
Physical state: Liquid
Appearance and odour: Amber, viscous liquid. Mild odour.
Specific gravity: 0.94 pH 10.0–11.5 (10% in D.W.)
Density (g/ml): 0.94
Water solubility: Dispersible in water.

3) REDICOTE AP

REDICOTE AP is the trade-mark of AKZO CHEMICALS INC. for its brand of asphalt peptizing agent. Its characteristics are as follows:

Initial Boiling Point—>300° C.>572° F. @ 760 mmHg
Melting/Freezing Point——20° C.~68° F.
Specific Gravity (H$_2$O=1) 0.957 @ 25° C.
Water Vapor Pressure (mmHg)—<0.1 @ 20° C.
Solubility in Water (1% by weight)—Insoluble
% Volatiles by weight—~1
Evaporation Rate—(Butylacetate=1)<1
Appearance and Odor—Amber liquid with a slight aromatic odor.
Flash Point—>204° C.>400° F.
Test Method—PMCC REDICOTE AP modifier is a cationic asphalt peptization agent which, when added to molten asphalt improves the emulsification and aging properties of the asphalt. REDICOTE AP modifier is adsorbed by the asphaltene constituent of asphalt, causing asphaltene agglomerates to be reduced in size and to be more evenly distributed throughout the continuous malthene phase.

| PHYSICAL PROPERTIES | |
|---|---|
| Pour Point | 50° F.(10° C.) |
| Viscosity, cps @ 60° C. | 205 |
| Specific Gravity @ 25° C. | 0.957 |
| Weight, lbs/gal @ 25° C. | 7.99 |

4) REDICOTE 82-S

REDICOTE 82-S is the trade-mark of AKZO CHEMICALS LTD. for its brand of tallow alkylamine.
Initial Boiling Point—171° C.@760 mmHg
Melting/Freezing Point—0° C.
Specific Gravity (H$_2$O=1)—0.841 @ 25° C.
Water Vapor Pressure (mmHg)—<1 @ 20° C.
Solubility in Water(% By Weight)—Insoluble
Evaporation Rate—(Butylacetate=1)<1
Appearance and Colour—Amber liquid with a petroleum solvent odour
Flash Point—89° C.
Test Method—PMCC
The properties of REDICOTE 82-S are as follows:

| Pour Point °C. | 0.3 |
|---|---|
| Flash Point, Pensky-Martens, °C. | 89.0 |
| Viscosity, cps @ 60° C. | 56.3 |
| Appearance @ 25° C. | Opaque liquid |
| Specific Gravity @ 25° C. | 0.841 |
| Weight, lbs/gal @ 25° C. | 7.00 |

As a comparison the following anti-stripping test data is provided for treated asphalt cement held @ 250° F. for 4 weeks:

| REDICOTE 82-S % | 0.3–0.75 |
|---|---|
| Asphalt type | 85/100 Pen. |
| Aggregate Type | Limestone; quartz |
| | Mass, rhyolite; |
| | Penn, whitehaven |
| Initial Coating % | 100 |
| Static Immersion Test | |
| (Modified), % stripped | approx. 1.0–7.0 |

The component type analysis of the asphalt blends used in this invention are shown on the next page in Table 1:

TABLE 1

Asphalt Separation by ASTM D 4124 Separation of Asphalt into Four Fractions

| Asphalt Blend | Asphaltene Wt % | Saturates Wt % | Naphthene Aromatics Wt % | Polar Aromatics Wt % |
|---|---|---|---|---|
| PC 150/200            0 | 9.3  | 16.0 | 35.9 | 38.8 |
| PC 150/200 +2% 82-S     | 9.3  | 16.8 | 35.1 | 38.8 |
| PC 250/200 +5% SDO      | 10.9 | 15.3 | 34.8 | 39.0 |
| PC 85/100             0 | 16.1 | 14.3 | 34.2 | 35.3 |
| PC 85/100 +2% 82-S      | 16.0 | 14.6 | 34.8 | 34.7 |
| PC 85/100 +5% SDO       | 17.0 | 13.0 | 33.3 | 36.7 |

PC = Petro Canada
SDO = Sewage Sludge-Derived Oil
82-S = REDICOTE 82-S

BRIEF DESCRIPTION OF THE DRAWINGS

In the accompanying drawings.

DESCRIPTION OF EXAMPLES OF PREFERRED EMBODIMENTS ANTI-STRIPPING PROPERTIES

The improvements in resistance to stripping, using Jaimeson aggregate in every case, are illustrated in Examples 1 to 4.

EXAMPLE 1

Figure 1:
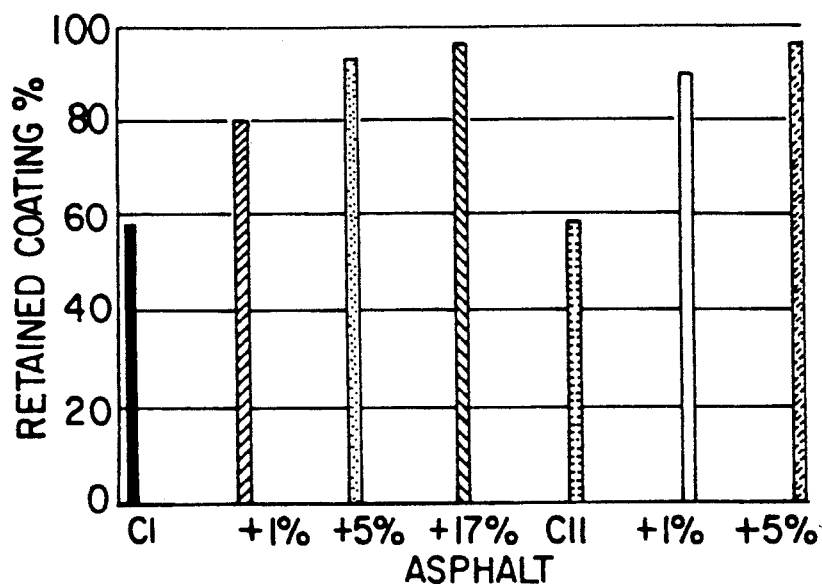
FIG. 1 is a graph of the anti-stripping tests with retained coating in %, as ordinate and sewage sludge-derived oil in asphalt, in %, as abscissa.

The resistance to stripping of an asphaltic composition of an aspect of this invention is summarized in the bar graph designated FIG. 1.

In the tests above, the 17% sewage sludge-derived oil was +400° C.; the 1% sewage sludge-derived oil and 5% sewage sludge-derived oil were +250° C. As seen in the FIG. 1, 1%, 5% and 17% of sewage sludge-derived oil was added to an asphalt cement which initially coated only 57% of the aggregate surface after the stripping test. With the addition of the sewage sludge-derived oil (1%, 5% and 17% by weight) the amount of coverage was raised to 80%, 92% and 95%, respectively. In the case of +250° C. sewage sludge-derived oil, 1% raised the coverage to 89% and 5% of sewage sludge-derived oil raised it to 96%. A minimum coverage of 95% is required by the Ministry of Transport for Ontario Protocol.

EXAMPLE 2

Figure 2:
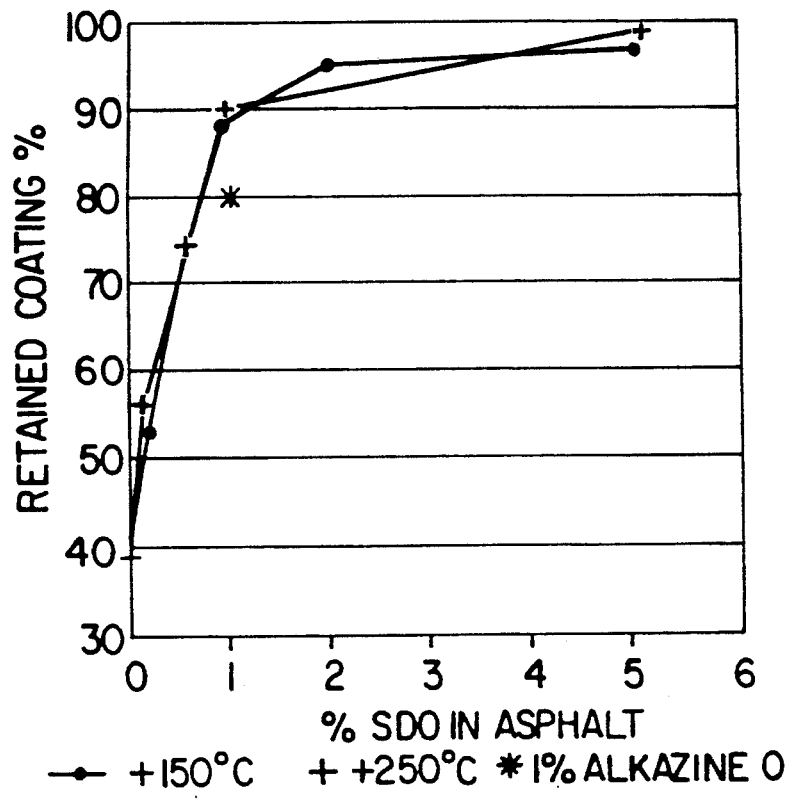
FIG. 2 is a graph of the static immersion stripping tests with retained coating in %, as ordinate and blend of anti-stripping agent as asphalt, in %, as abscissa.

An anti-stripping test was carried out using Shell 85/100 asphalt with either +150° C. sewage sludge-derived oil, or +250° C. sewage sludge-derived oil or ALKAZINE O $_{TM}$. The graphical results of such anti-stripping test is shown in FIG. 2.

The coverage of aggregate after the stripping test for the asphalt alone was 38%. When 0.1% amount of each of +150° C. sewage sludge-derived oil and 250° C. sewage sludge-derived oil were added, the coverage was raised to 55% in both cases; 0.5% of both sewage sludge-derived oil fractions increased it to 74%; and 1% increased it to 90%. 2% addition of the +150° C. sewage sludge-derived oil increased coverage to 95%. 5% addition of both sewage sludge-derived oil fractions increased coverage to 99 and 97%. Comparison with the commercial anti-stripping agent ALKAZINE O $_{TM}$ at 1%, shows that such commercial anti-stripping agent was not as effective as the sewage sludge-derived oil fractions.

EXAMPLE 3

Static immersion stripping tests were carried out using a blend of Petro Canada, Gulf and Shell 85/100 asphalts with different blending agents, namely two kinds of sewage sludge-derived oil, ALKAZINE O $_{TM}$, REDICOTE AP $_{TM}$ and REDICOTE 82-S $_{TM}$. vs. retained coating.

Figure 3:
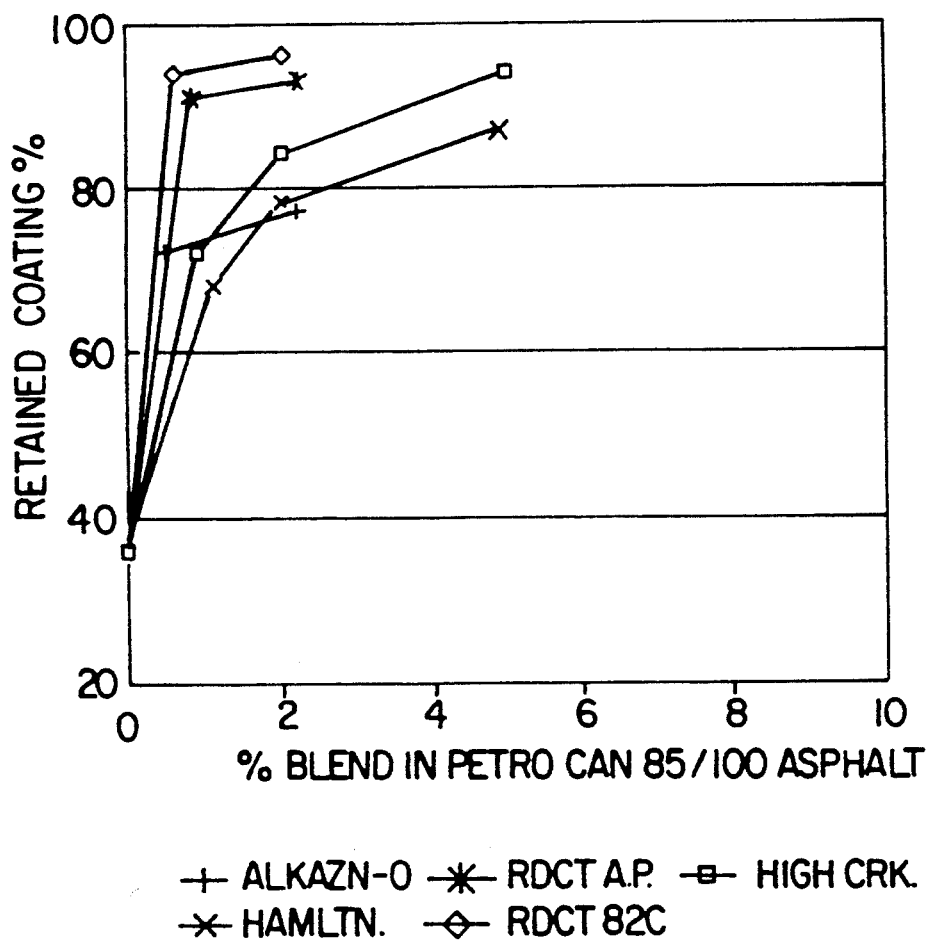
FIG. 3 is a graph of the retained coating tests with retained coating in % as ordinate, and SDO in asphalt, in %, as abscissa
Figure 4:
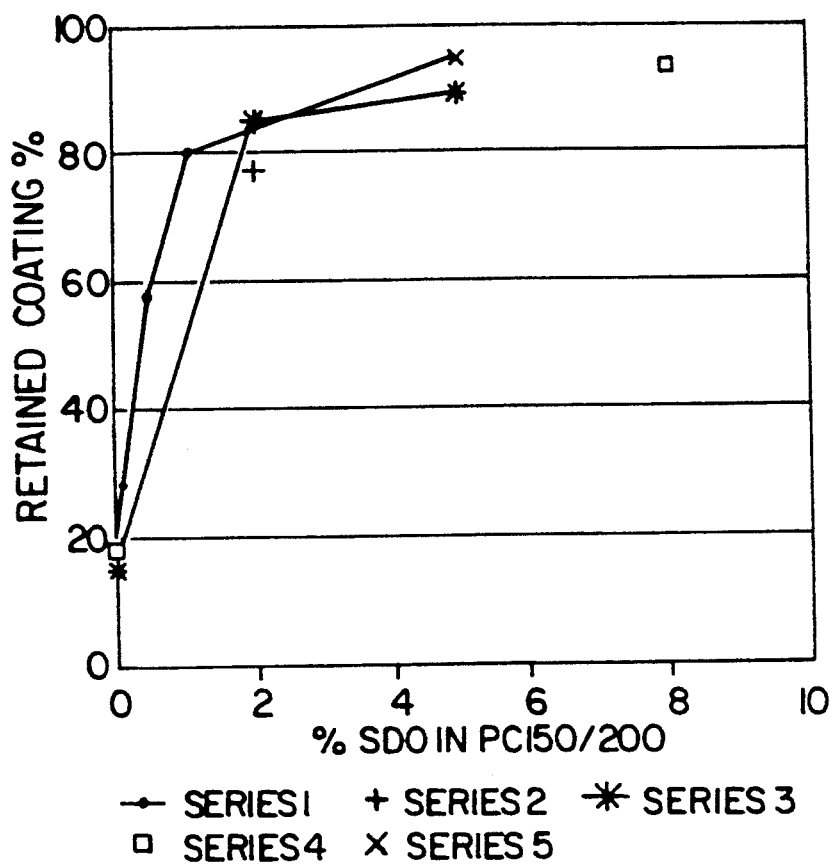
FIG. 4 is a graph of the retained coating in % as the ordinate, and SDO in asphalt, in %, as the abscissa.

The results are summarized in Table 2 and in FIG. 3.

TABLE 2

Stripping by Immersion Test

| Asphalt Blend | | Retained Coating (%) |
|---|---|---|
| Gulf 85/100  | 0% SDO         | 58 |
|              | 1% SDO + 250C  | 80 |
|              | 5% SDO + 250C  | 93 |
|              | 17% SDO + 400C | 96 |
| Shell 85/100 | 0% SDO         | 58 |
|              | 1% SDO + 250C  | 90 |
|              | 5% SDO + 250C  | 97 |

SDO = sewage sludge-derived oil

As seen in FIG. 3, +150° C. sewage sludge-derived oil, from Hamilton, Ontario and from Highland Creek, Ontario, i.e. from different sources, is compared with several commercial synthetic anti-stripping agents. These sewage sludge-derived oil samples had lower nitrogen contents and consequently were not quite as effective as the Atlanta, Georgia sewage sludge-derived oil of the previous tests.

EXAMPLE 4

Retained coating tests were carried out on asphaltic compositions of Petro Canada 150/200 asphalt cement, Jaimeson aggregate and five evaluations using +150° C. sewage sludge-derived oil. More complete data and other commercial asphalt cement blends with both sewage sludge-derived oil and other anti-stripping agent is shown on the next pages in Tables 3 and 4.

TABLE 3

| Test Units | | Strp Imm. % | Pen 4 25 30° C. dmm | Pt. C | Flash 60° C. P | Viscosity 135° C. cSt | Ductil. cm |
|---|---|---|---|---|---|---|---|
| Pet Can 85/100 | | | | | | | |
| 0% SDO         |      | 36 | 8, 96, 158   | 324 | 1573 | 332.1 | +150 |
| 2% Rdct 82-S   |      | 73 | 13, 121, 144 | 300 | 1043 | 278   | +150 |
| +150° C. SDO   | 5.0% | 88 | 13, 156, 169 | 248 | 1044 | 226   | +150 |

TABLE 3-continued

| Pet Can 150/200 | | | | | | | | |
|---|---|---|---|---|---|---|---|---|
| 0% SDO | | 20 | 15, 174, 218 | 316 | 476.1 | 191.8 | | 130 |
| 2% Rdct 82-S | | 85 | 16, 194, 292 | 304 | 389.4 | 168.8 | | +150 |
| +150° C. | 5.0% | 95 | 19, 242, 301 | 264 | 315.1 | 141.6 | | +150 |
| Spec MTO | | | | | | | | |
| 85/100 | | 95+ | | >232 | | | | >100 |
| 150/200 | | +95 | | >220 | | | | >100 |
| Atlanta SDO | | | | | | | | |

| | | | After TFOT | | | | | |
|---|---|---|---|---|---|---|---|---|
| | | TriClEth. | TFOT | Pen. | | Viscosity | | Strp. |
| Test | | Sol'ty | Wt. Loss | 25° C. | | 60° C. | 135° C. | Duct. | Imm. |
| Units | | % | % | dmm | Ret. % | P | cSt | cm | % |
| Pet Can 85/100 | | | | | | | | | |
| 0% SDO | | 99.93 | 0.024 | 53 | 55.2 | 3178 | 446.2 | 150+ | 25 |
| 2% Rdct 82-S | | 99.93 | 0.16 | 68 | 56.2 | 1915 | 367.3 | 138 | 97 |
| +150° C. SDO | 5% | 99.85 | 0.91 | 75 | 48.1 | 1756 | 340.3 | 150+ | 94 |
| Pet Can 150/200 | | | | | | | | | |
| 0% SDO | | 99.95 | 0 | 99 | 56.9 | 799.5 | 244 | | |
| 2% Rdct 82-S | | 99.96 | 0.08 | 138 | 71.1 | 569 | 207.8 | 150+ | 95 |
| +150° C. SDO | 5% | 99.85 | 0.84 | 132 | 54.5 | 613.5 | 183.7 | 150+ | 95 |
| Spec ASTM D946 | | | | | | | | | |
| 85/100 | | >99 | >0.85 | | >47 | | | >75 | |
| 150/200 | | >99 | | | >40 | | | | |

Strp. Imm. = Static Immersion Stripping Test
Pen = Penetration
Pet Can = Petro Canada
Rdct 82-S = REDICOTE 82-S ™
SDO = *Sewage Sludge-Derived Oil*
MTO = *Ministry of Transport of Ontario*
Ductil = *Ductility*
TFOT = *Thin-Film Oven Test*

TABLE 4

| | Strp | Pen | Flash | Viscosity | | | TriClEth. | TFOT |
|---|---|---|---|---|---|---|---|---|
| Test | Imm. | 4, 25, 30° C. | Pt. | 60° C. | 135° C. | Ductil. | Sol'ty | Wt. Loss |
| Units | % | dmm | C | P | cSt | cm | % | % |
| Shell 85/100 | | | | | | | | |
| 0% SDO | 39 | 8, 83, | | | 392 | | | |
| 1% Alk O | 80 | | | | | | | |
| +150° C. SDO: | | | | | | | | |
| 0.1% | 53 | | | | | | | |
| 0.5% | 73 | | | | | | | |
| 1.0% | 89 | | | | | | | |
| 2.0% | 95 | 9, 91, | 286 | 1292 | 327.4 | | | 0.296 |
| 5.0% | 97 | | | | | | | |
| +250° C. SDO: | | | | | | | | |
| 0.1% | 56 | | | | | | | |
| 0.5% | 74 | | | | | | | |
| 1.0% | 90 | | | | | | | |
| 5.0% | 99 | | | | | | | |
| Pet Can 85/100 | | | | | | | | |
| 0% SDO | 36 | 8, 96, 158 | 324 | | 332.1 | | | 0.024 |
| 0.6% Rdct 82-S | 94 | | | | | | | |
| 2% Rdct 82-S | 73 | , 121, | | | 278 | | | |
| 1% Nal | 94 | | | | | | | |
| +150° C. SDO: | | | | | | | | |
| 2.0% | 71 | | | | | | | |
| 2.9% | 74 | | | | | | | |
| 5.0% | 88 | , 156, | | | 226 | | | 0.91 |
| 8.0% | 93 | , 232, | | | 176 | | | 1.36 |
| Pet Can 150/200 | | | | | | | | |
| 0% SDO | 20 | 12, 174, | 316 | | 191.8 | | | 0 |
| 1% Alk O | 75 | | | | | | | |
| 0.6% Rdct 82-S | 85 | , 194, | | | 168.8 | | | |
| 1% Nal | 87 | | | | | | | |
| +150° C. SDO: | | | | | | | | |
| 0.1% | 28 | | | | | | | |
| 0.5% | 58 | | | | | | | |
| 1.0% | 80 | | | | | | | |
| 2.0% | 71 | 12, 187, | 314 | 535.7 | 170.1 | | | 0.305 |
| 5.0% | 95 | , 242, | | | 141.6 | | | |
| 8.0% | 93 | , 327, | | | 120.3 | | | 1.38 |
| +250° C. SDO: | | | | | | | | |
| 0.1% | 28 | | | | | | | |
| 0.5% | 64 | | | | | | | |
| 1.0% | 80 | | | | | | | |

TABLE 4-continued

| | Pen. 25° C. dmm | Ret. % | Viscosity 60° C. P | 135° C. cSt | Duct. cm | | |
|---|---|---|---|---|---|---|---|
| 5.0% | 95 | | | | | | |
| Spec MTO | | | | | | | |
| 85/100 | 95 | | >232 | | >100 | >99 | >0.85 |
| 150/200 | 95 | | | | >100 | >99 | |
| Atlanta SDO | | | | | | | |

| | AFTER TFOT | | | | |
|---|---|---|---|---|---|
| | Pen. 25° C. | | Viscosity | | Duct. |
| Tests | | | 60° C. | 135° C. | |
| Units | dmm | Ret. % | P | cSt | cm |
| Shell 05/200 | | | | | |
| 0% SDO | | | | | |
| 1% Alk O | | | | | |
| +150° C. SDO: | | | | | |
| 0.1% | | | | | |
| 0.5% | | | | | |
| 1.0% | | | | | |
| 2.0% | 62 | 68.1 | 3532 | 512 | |
| 5.0% | | | | | |
| +250° C. SDO: | | | | | |
| 0.1% | | | | | |
| 0.5% | | | | | |
| 1.0% | | | | | |
| 5.0% | | | | | |
| Pet Can 85/100 | | | | | |
| 0% SDO | | | | | |
| 0.6% Rdct 82-S | | | | | |
| 1% Nal | | | | | |
| +150° C. SDO: | | | | | |
| 2.0% | | | | | |
| 2.9% | | | | | |
| 5.0% | | | | | |
| 8.0% | | | | | |
| Pet Can 150/200 | | | | | |
| 0% SDO | | | | | |
| 1% Alk O | | | | | |
| 0.6% Rdct 82-S | | | | | |
| 2% Rdct 82-S | | | | | |
| 1% Nal | | | | | |
| +150° C. SDO: | | | | | |
| 0.1% | | | | | |
| 0.5% | | | | | |
| 1.0% | | | | | |
| 2.0% | 113 | 60.4 | 634.6 | 260 | |
| 5.0% | | | | | |
| 8.0% | | | | | |
| +250° C. SDO: | | | | | |
| 0.1% | | | | | |
| 0.5% | | | | | |
| 1.0% | | | | | |
| 5.0% | | | | | |
| Spec ASTM D946 | | | | | |
| 85/100 | | >47 | | | |
| 150/200 | | >40 | | >75 | |
| Atlanta SDO | | | | | |

Alk O = ALKAZINE O TM
Rdct 82-S = REDICOTE 82-S TM
Nal = NALCLAD TM
SDO = Sewage Sludge-Derived Oil
MTO = Ministry of Transport of Ontario
Ductil = Ductility
TriClEth. Sol'ty = Solubility in Trichloroethylene
TFOT = Thin-Film Oven Test
Pen = Penetration
Strp. Imm. = Static Immersion Stripping Test As seen in these tables, the addition of anti-stripping agents to asphalt, since they are generally of much lower viscosity than the asphalt, increases the penetration. This might have the advantage of allowing the use of somewhat harder asphalt but is disadvantaged for softer asphalts that are near the limits of penetration and viscosity specifications.

There appears to be no problem with meeting flash point requirements even for the +150° C. sewage sludge-derived oil up to the 5% addition level for the 85/100 and 150/200 asphalts.

EXAMPLE 5

The sewage sludge-derived oil addition up to the 5% level does not appear to lower the ductilities of the asphalt. In fact, in one case, it even improved it even after the Thin-Film Oven Test, as shown in Tables 2 and 3.

EXAMPLE 6

The compatibility of sewage-sludge derived oil with heavy residual materials has been assessed. Sewage sludge-derived oil was added to high conversion hydrocracking pitch (S.P. 111° C.) and to ROSE$_{TM}$ residue (S.P. 158° C.) in equal proportions, heated until liquid and thoroughly mixed.

A description of the characteristics of the above-referred-to CANMET hydrocracking pitch is as follows:

Very heavy material. Typically 50–80% Asphaltenes.

Asphaltene content varies with the feedstock and the conversion rate selected for the process. (See U.S. Pat. No. 4,683,005 Jul. 28, 1987 M. A. Poirier).

A description of the characteristics of the above-referred-to ROSE$_{TM}$ residue is as follows:

Residuum Oil Supercritical Extraction (ROSE$_{TM}$) process by the phenomena of super critical solubility separates asphaltenes from heavy oil residues using normal butane solvent. The characteristics of the pitch will vary according to the feed stock used and solvent. The ROSE$_{TM}$ residue had a softening point of 158° C. but typically very high in asphaltenes: R & B softening Pt. 80°–100° C.

| | |
|---|---|
| Viscosities | 200–400 cSt @ 200° C. |
| Nickel & Vanadium | 100–300 wppm (high) |

An aged Athabascan asphaltene fraction was similarly treated with twice its weight of sewage sludge-derived oil.

In the case of the hydrocracking pitch and the ROSE$_{TM}$ residue blends, the materials appeared to dissolve completely in the sewage sludge-derived oil. In the case of the asphaltenes, there appeared to be only a very small portion of skin-like material that did not dissolve in the sewage sludge-derived oil. This small amount of insoluble material probably was due to oxidation of the asphaltene fraction on ageing.

The mixtures were very viscous, on cooling, but no phase separation could be detected, even after several months. Thus, it is believed that the sewage sludge-derived oil has an affinity for heavy asphaltic materials, and they are considered to be peptizing agents for the asphaltenic miscible fractions in asphalt.

Therefore the SDO fractions are believed to be desirable asphalt additives.

It is further believed that the asphalt compositions of this invention may be used as a coating for waterproofing wood, concrete, organic cloth or fibres, steel articles and soil. The sewage sludge-derived oil would be expected to improve adhesion.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

What we claim is:

1. A bituminous coating compositions consisting essentially of: an asphalt selected from the group consisting of bitumen, asphalt and crude residuum containing asphaltenes; and an effective amount, from about 0.1% to about 8% by weight, of a nitrogen-containing, adhesion-improving, anti-stripping agent comprising sewage sludge-derived oil, or a fraction thereof, said sewage sludge-derived oil comprising a mixture of saturated aliphatic hydrocarbons, monoaromatic hydrocarbons, diaromatic hydrocarbons, polyaromatic hydrocarbons, polar compounds and basic, pyridine-soluble compounds having the following elemental composition: nitrogen, about 3.4% to about 5% by weight; oxygen, about 5.8% to about 6.9% by weight; sulfur, about 0.3% to about 0.8% by weight; hydrogen, about 9.7% to about 10.4% by weight; and carbon, about 76.9% to about 79.8% by weight.

2. The bituminous coating composition of claim 1 wherein said effective amount of said nitrogen-containing adhesion-improving agent is from about 1% to about 5% by weight.

3. The bituminous coating composition of claim 2 wherein said sewage sludge-derived oil has the following elemental composition: nitrogen, 3.42% to 4.95% by weight; oxygen, 5.84% to 6.89% by weight; sulfur, 0.34% to 0.83% by weight; hydrogen, 9.70% to 10.44%; and carbon, 76.92% to 79.76% by weight.

4. The bituminous coating composition of claim 3 wherein said effective amount of said nitrogen-containing, adhesion-improving agent is from about 1% to about 5% by weight.

5. A bituminous paving composition consisting essentially of: aggregate; an asphalt selected from the group consisting of bitumen, asphalt and crude residuum containing asphaltenes; and an effective amount, from about 0.1% to about 8% by weight, of a nitrogen-containing, adhesion-improving anti-stripping agent comprising sewage sludge-derived oil, or a fraction thereof, said sewage sludge-derived oil comprising a mixture of saturated aliphatic hydrocarbons, monoaromatic hydrocarbons, diaromatic hydrocarbons, polyaromatic hydrocarbons, polar compounds and basic, pyridine-soluble compounds, having the following elemental composition: nitrogen, about 3.4% to about 5% by weight; oxygen, about 5.8% to about 6.9% by weight; sulfur, about 0.3% to about 0.8% by weight; hydrogen, about 9.7% to about 10.4% by weight; and carbon, about 76.9% to about 79.8% by weight.

6. The bituminous paving composition of claim 5 wherein said sewage sludge-derived oil has the following elemental composition: nitrogen, 3.42% to 4.95% by weight; oxygen, 5.84% to 6.89% by weight; sulfur, 0.34% to 0.83% by weight; hydrogen, 9.70% to 10.44%; and carbon, 76.92% to 79.76% by weight.

7. An asphaltic composition consisting essentially of: an asphaltic cement; and an effective amount, from about 0.1% to about 8% by weight, of a nitrogen-containing, adhesion-improving, anti-stripping agent comprising sewage sludge-derived oil, or a fraction thereof, said sewage sludge-derived oil comprising a mixture of saturated aliphatic hydrocarbons, monoaromatic hydrocarbons, diaromatic hydrocarbons, polyaromatic hydrocarbons, polar compounds and basic, pyridine-soluble compounds, having the following elemental chemical composition: nitrogen, about 3.4% to about 5% by weight; oxygen, about 5.8% to about 6.9% by weight; sulfur, about 0.3% to about 0.8% by weight; hydrogen, about 9.7% to about 10.4% by weight, and carbon, about 76.9% to about 79.8% by weight.

8. The asphalt composition of claim 7 wherein said effective amount of said nitrogen-containing, adhesion-improving agent is from about 1% to about 5% by weight.

9. The asphalt composition of claim 7 wherein said sewage sludge-derived oil has the following elemental composition: nitrogen, 3.42% to 4.95% by weight; oxygen, 5.84% to 6.89% by weight; sulfur, 0.34% to 0.83% by weight; hydrogen, 9.70% to 10.44%; and carbon, 76.92% to 79.76% by weight.

10. An asphaltic composition consisting essentially of: comminuted aged asphaltic pavement material; an effective amount, from about 2% to about 15% by weight of a blend of an agent selected from the group consisting of a soft asphalt cement, a conventional asphalt cement, and a cutback asphalt, with a nitrogen-containing, adhesion-improving agent comprising a sewage sludge-derived oil, or a fraction thereof, comprising a mixture of saturated aliphatic hydrocarbons, monoaromatic hydrocarbons, diaromatic hydrocarbons, polyaromatic hydrocarbons, polar compounds and basic, pyridene-soluble compounds, having the following elemental chemical composition: nitrogen, about 3.4% to about 5% by weight; oxygen, about 5.8% to about 6.9% by weight; sulfur, about 0.3% to about 0.8% by weight; hydrogen, about 9.7% to about 10.4%, and carbon, about 76.9% to about 79.8%.

11. An asphaltic composition consisting essentially of: comminuted aged asphaltic pavement material; an effective amount, from about 2% to about 15% by weight of a blend of an agent selected from the group consisting of a soft asphalt cement, a conventional asphalt cement, and a cutback asphalt, with a nitrogen-containing, adhesion-improving agent comprising a sewage sludge-derived oil, or a fraction thereof, comprising a mixture of saturated aliphatic hydrocarbons, monoaromatic hydrocarbons, diaromatic hydrocarbons, polyaromatic hydrocarbons, polar compounds and basic, pyridene-soluble compounds, having the following elemental chemical composition: nitrogen, about 3.42% to 4.95% by weight; oxygen, 5.84% to 6.89% by weight; sulfur, 0.34% to 0.83% by weight; hydrogen, 9.70% to 10.44%, and carbon, about 76.92% to 79.76%.

* * * * *